(12) United States Patent
Lal et al.

(10) Patent No.: US 12,081,443 B2
(45) Date of Patent: Sep. 3, 2024

(54) ADAPTIVE CONTROL PLANE POLICING

(71) Applicant: Cisco Technology, Inc., San Jose, CA (US)

(72) Inventors: Roshan Lal, San Jose, CA (US); Rishi Chhibber, Dublin, CA (US); Anand Kumar Singh, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 17/381,552

(22) Filed: Jul. 21, 2021

(65) Prior Publication Data
US 2023/0030452 A1    Feb. 2, 2023

(51) Int. Cl.
*H04W 72/23*    (2023.01)
*H04L 1/00*    (2006.01)
*H04L 1/1867*    (2023.01)
*H04L 5/00*    (2006.01)
*H04L 47/2441*    (2022.01)
*H04L 47/25*    (2022.01)
*H04L 47/32*    (2022.01)

(52) U.S. Cl.
CPC .......... *H04L 47/2441* (2013.01); *H04L 47/25* (2013.01); *H04L 47/32* (2013.01)

(58) Field of Classification Search
CPC ...... H04L 47/2441; H04L 47/25; H04L 47/32
USPC .......................................................... 370/235
See application file for complete search history.

(56) References Cited

U.S. PATENT DOCUMENTS

| | | |
|---|---|---|
| 9,485,118 B1 | 11/2016 | Atlas et al. |
| 2009/0180377 A1 | 7/2009 | Sullivan et al. |
| 2012/0195198 A1 | 8/2012 | Regan |
| 2017/0331747 A1* | 11/2017 | Singh ...................... H04L 47/20 |
| 2018/0234297 A1 | 8/2018 | Wang et al. |
| 2020/0259731 A1* | 8/2020 | Sivaraman ............ H04L 43/026 |
| 2021/0092068 A1* | 3/2021 | Ismailsheriff ......... H04L 47/283 |

* cited by examiner

*Primary Examiner* — Nizam U Ahmed
(74) *Attorney, Agent, or Firm* — Lee & Hayes, P.C.

(57) ABSTRACT

Techniques are described for an adaptive CoPP that can adapt and change based on actual network control traffic rather than static CoPP rates. An aggressive CoPP can protect the CPU (route processor) of a network device, e.g., routers and switches, but may also penalize convergence and performance. An adaptive CoPP may protect CPU as well as boost convergence and performance parameters. In particular, traffic between two sites may be managed by proactively changing the thresholds of lower CoS traffic based on the CoPP utilization of various protocol/BPDU class traffic, thereby improving data plane convergence and application performance in scaled environments.

16 Claims, 4 Drawing Sheets

ADAPTIVE CONTROL PLANE POLICING

TECHNICAL FIELD

The present disclosure relates generally to dynamically adapting control plane policing of control plane traffic in a network.

BACKGROUND

Control plane policing (abbreviated as CoPP and CPP; CoPP herein) is an application of quality of service (QoS) technologies in a security context that is available on switches and routers that allows the configuration of QoS policies that rate limit the traffic handled by the main CPU of the network device. This protects the control plane of the router or switch from direct denial-of-service (DoS) attacks, reconnaissance activity, and other unexpected flooding of the control plane.

CoPP protects IOS-based routers and switches by allowing the definition and enforcement of QoS policies that regulate the traffic processed by the main router CPU (route processor (RP) or switch processor). With CoPP, these QoS policies are configured to permit, block, or rate limit the packets handled by the main CPU. Often, routers and switches provide default CoPP policies and parameters with an option to configure CoPP policies and parameters based on the network traffic pattern. Although a user can customize the CoPP policies and parameters, adapting to changing network traffic pattern requires manual intervention.

Protocol traffic, e.g., open shortest path first (OSPF), border gateway protocol (BGP), protocol independent multicast (PIM), etc., and bridge protocol data unit (BPDU) class traffic, e.g., spanning tree protocol (STP), discovery protocol traffic e.g., CDP, link aggregation control protocol (LACP), etc., are generally classified under the critical class of network traffic and are marked with higher class of service (CoS) values (e.g., CoS 5 to 7). These critical classes are typically unpoliced or very leniently policed under CoPP for the healthy functioning of the network, whereas some of the data plane class traffic that needs to be processed by the main CPU, e.g., address resolution protocol (ARP)/Glean, Sflow, etc., are marked with lower CoS values, e.g., CoS 0 to 3. Such data plane class traffic is generally very aggressively policed to protect the main CPU, which can have an impact with respect to faster convergence or application performance in scaled environments.

Generally, the CoPP thresholds are static in nature and are mostly based on the overall CPU processing and the control plane capacity of the platform. Generally, the traffic load utilization of class critical traffic, overall inband traffic utilization, etc., is not considered in CoPP.

Data center aggregation switches can have large IPv4/IPv6 hosts behind them. For example, certain switched can support 90K IPv4 hosts and 40K IPv6 hosts. When there is a topology change that needs learning of these hosts via glean and ARP traffic, allowed CoPP limit for this traffic can easily become bottleneck when control plane has unused capacity.

Manual tuning of CoPP parameters needs careful understanding of deployment scenarios and control traffic patterns. The fundamental purpose of CoPP is to provide control plane protection, however a static CoPP can lead to inefficient usage of control plane capacity and penalizing on convergence and overall system performance for certain requirements. This leads to inefficient utilization of control plane capacity, impacts data plane convergence and performance of several applications like network application translation (NAT) and Sflow.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques and architecture for providing an adaptive CoPP that can adapt and change based on actual network control traffic rather than static CoPP rates. An aggressive CoPP can protect the CPU (route processor) of a network device, e.g., routers and switches, but may also penalize convergence and performance. An adaptive CoPP may protect CPU as well as boost convergence and performance parameters. In particular, traffic between two sites may be managed by proactively changing the thresholds of lower CoS traffic based on the CoPP utilization of various protocol/BPDU class traffic, thereby improving data plane convergence and application performance in scaled environments.

In configurations, traffic between two sites may be managed by proactively changing the thresholds of lower CoS traffic based on the CoPP utilization of various protocol/BPDU class traffic, thereby improving data plane convergence and application performance in scaled environments.

Most network deployments are part of repeated workloads. For example, a stock exchange generally has a certain traffic pattern over a week, a month, and a year. A media broadcasting network generally also has a certain pattern over a day, a week, and so on. While the traffic pattern changes over a period of time, over a larger period of time, the traffic pattern follows in an ebb and flow pattern.

In real time, the router is aware of how much control traffic the router is currently processing and how much the router is capable of processing. The router is also aware of what packet drops are occurring due to CoPP being in place. All this information may be provided to the CoPP system present on the router 104 to proactively adjust the rate or allocation of overall packets travelling to the control plane and in turn, to improve convergence while at the same time creating a learned pattern of traffic change over time.

In configurations, until the pattern of traffic is learned, any CoPP changes may be reactive in the network. Once a pattern is identified, the CoPP settings and parameters may be proactively modified in anticipation of upcoming changes in the traffic pattern. This tuning of the CoPP settings and parameters may allow traffic rates for various CoSs to be different than static default parameters of the CoPP and at the same time not affecting other elements.

In configurations, the network traffic pattern may be learned using a machine learning model or algorithm. In configurations, the machine learning model may be used to learn network traffic patterns through a training set of data mined from historical network traffic including data from the network, as well as other networks and/or network devices external to the network. The machine learning model learn network traffic patterns through current network, e.g., while network traffic is currently occurring, either separately or in conjunction with the historical training set. In such configurations, as previously noted, until the network traffic pattern is learned, any CoPP changes may be reactive in the network.

In configurations, the machine learning model, also known as a deep learning model, may comprise a Random Forest machine learning model, which is a supervised algorithm. In other configurations, the machine learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Other architectures and algorithms may be used for the deep learning model if desired.

Implementation of the proactive CoPP settings may also consider the number of active FEs (which are moving certain amounts of the control traffic to the router's CPU) available on the router 104. For example, considering allowed ARP for 1500 packets/second, it may take 60 seconds+ to do ARP for 90K hosts. If that amount is increased to 3000 packets/second, convergence improves by 50%.

For example, a method may include learning, at a routing network device, a network traffic flow pattern related to traffic within a network. The method may also include based at least in part on the network traffic flow pattern, assigning, by the routing network device, modified allocations of network control plane traffic for each class of traffic of a plurality of classes of traffic, wherein the modified allocations of network control plane traffic are with respect to default allocations of network control plane traffic for each class of traffic of a plurality of classes of traffic. The method may further include receiving, at the routing network device within the network, network control plane traffic destined for a central processing unit (CPU) of the routing network device. Additionally, the method may include based at least in part on a current factor related to the network traffic flow pattern within the network, determining, by the routing network device, a current allocation of network control plane traffic for each class of traffic of a plurality of classes of traffic to provide a determined current allocation of traffic for each class of traffic. The method may also include determining, by the routing network device, the class of traffic for each packet of the network control plane traffic to provide a determined class of traffic. The method may further include based at least in part on the determined class of traffic of a particular packet and the determined current allocation of traffic for the determined class of traffic, one of (i) routing the particular packet to the CPU of the routing network device or (ii) dropping the particular packet. The method may additionally include based at least in part on changes of traffic within the network, altering, by the routing network device, the network traffic flow pattern. The method may further include based at least in part on altering the network traffic flow pattern, altering, by the routing network device, the modified allocations of network control plane traffic for each class of traffic of the plurality of classes of traffic.

The techniques described herein may be performed by a system and/or device having non-transitory computer-readable media storing computer-executable instructions that, when executed by one or more processors, performs the method described above.

Example Embodiments

As is known, network devices, such as, for example, routers and switches use a conceptual model referred to as "planes." Planes describe how packets travel to, from, and through a network device. The control and data planes do not describe data itself. Rather, these planes describe how the device handles the data. To make matters trickier, each network device may see the traffic in a different way. One network device may classify traffic as data plane traffic, while another network device may classify the same traffic as part of the control plane.

The data plane (or forwarding plane) is the high-speed path through the network device. Packets that pass through the network device use the data plane, as opposed to packets directed to the network device. For this reason, the data plane is also called the forwarding plane. The data plane needs to provide a high speed and low latency path. To achieve this, a lot of data plane implementation is in hardware. This includes performing express forwarding (CEF) lookups/caching and using special application-specific integrated circuits (ASICs). The forwarding information base (FIB) and label forwarding information base (LFIB) are part of the data plane. Virtual switches are a little bit different. Virtual switches do not generally have specialized hardware to create a high-speed data path. This does not mean that they don't have a data plane. Software techniques, such as special data structures and optimized kernels, provide the forwarding path. But what about management traffic? What if management traffic passes through a network device, destined for another network device? Such traffic is generally being forwarded, so for such network device, the network device uses the forwarding plane (or data plane).

The control plane is generally considered to be where a router or switch makes its decisions. This is software based and uses the CPU of a network device rather than specialized hardware, such as an ASIC. For this reason, many people often refer to the control plane the "slow path." Well, traffic sent to a network device or generated on a device is control plane traffic. An example of this is when a router forms neighbor relationships in OSPF or enhanced interior gateway routing protocol (EIGRP) or when switches share bridge protocol data units BPDUs for spanning-tree. Another function of the control plane is to assign resources to the data plane. An example of this is using the data from the routing information base (RIB) to populate the FIB. A logical subset of the control plane is the management plane. Any management traffic for the local network device (such as SSH) is part of the management plane. This is because the destination of the management traffic is the local network device.

As noted above, control plane policing (abbreviated as CoPP and CPP; CoPP herein) is an application of quality of service (QoS) technologies in a security context that is available on switches and routers that allows the configuration of QoS policies that rate limit the traffic handled by the main CPU of the network device. This protects the control plane of the router or switch from direct denial-of-service (DoS) attacks, reconnaissance activity, and other unexpected flooding of the control plane, e.g., surges in network traffic.

CoPP protects IOS-based routers and switches by allowing the definition and enforcement of QoS policies that regulate the traffic processed by the main switch CPU (route processor (RP) or switch processor). With CoPP, these QoS policies are configured to permit, block, or rate limit the packets handled by the main CPU. Often, routers and switches provide default CoPP policies and parameters with an option to configure CoPP policies and parameters based on the network traffic pattern.

A router or switch may be logically divided into four functional components or planes: data plane; management plane; control plane; and services plane. The vast majority of traffic travels through the router via the data plane. However, the route/switch processor (which will hereafter be abbreviated as RP, for route processor) must handle certain packets, such as routing updates, keepalives, and network management. This is often referred to as control and management plane traffic. A few brief examples of types of traffic include SSH to a router uses the control plane. Passing SSH traffic through a network device to another network device uses the data plane. A BGP neighbor relationship uses the control plane. Forwarding BGP traffic uses the data plane. OSPF neighbor relationships and building the LSDB uses the control plane. A special case may include the control and data planes spanning across a "fabric." An example of this is a spine/leaf topology in a data center. In this case, BGP EVPN provides a distributed control plane.

Because the RP is critical to network operations, any service disruption to it or the control and management planes can result in business-impacting network outages. For example, a DoS attack targeting the RP, which can be perpetrated either inadvertently or maliciously, usually involves high rates of traffic that needs to be punted up to the CPU (from local routing cache or distributed routing engines) that results in excessive CPU utilization on the RP itself. This may be the case with packets destined to non-existent networks or other routing failures. This type of attack, which can be devastating to network stability and availability, may display the following symptoms: high route processor CPU utilization (near 100 percent); loss of line protocol keepalives and routing protocol updates, leading to route flaps and major network transitions; interactive sessions via the command-line interface (CLI) are slow or completely unresponsive due to high CPU utilization; RP resource exhaustion, meaning that resources such as memory and buffers are unavailable for legitimate IP data packets; and packet queue backup, which leads to indiscriminate drops (or drops due to lack of buffer resources) of other incoming packets. One or more of these symptoms may also be present due to surges in network traffic.

CoPP addresses the need to protect the control and management planes, ensuring routing stability, availability, and packet delivery. It uses a dedicated control plane configuration via the modular QoS command-line interface (MQC) to provide filtering and rate limiting capabilities for control plane packets.

Packets handled by the main CPU, generally referred to as control plane traffic, may typically include the following: routing protocols; packets destined to the local IP address of the router; packets from network management protocols, such as, for example, simple network management protocol (SNMP); interactive access protocols, such as secure shell (SSH) and telnet; other protocols, such as internet control message protocol (ICMP), or IP options, might also require handling by the switch CPU; layer 2 packets such as bridge protocol data unit (BPDU), discovery protocol (e.g., CDP), DOT1X, etc.; and layer 3 protocols such as authentication, authorization, and accounting (AAA), syslog, network time protocol (NTP), Internet security association and key management protocol (ISAKMP), resource reservation Protocol (RSVP), etc.

CoPP leverages the MQC for its QoS policy configuration. MQC allows the classification of traffic into classes and lets one define and apply distinct QoS policies to separately rate limit the traffic in each class. MQC lets one divide the traffic destined to the CPU into multiple classes based on different criteria. For example, four traffic classes may be defined based on relative importance: critical; normal; undesirable; and default.

Although a user can customize the CoPP policies and parameters, adapting to changing network traffic pattern requires manual intervention. Protocol traffic, e.g., open shortest path first (OSPF), border gateway protocol (BGP), protocol independent multicast (PIM), etc., and bridge protocol data unit (BPDU) class traffic, e.g., spanning tree protocol (STP), discovery protocol traffic e.g., CDP, link aggregation control protocol (LACP), etc., are generally classified under the critical class of network traffic and are marked with higher class of service (CoS) values (e.g., CoS 5 to 7). These critical classes are typically unpoliced or very leniently policed under CoPP for the healthy functioning of the network, whereas some of the data plane class traffic that needs to be processed by the main CPU, e.g., address resolution protocol (ARP)/Glean, Sflow, etc., are marked with lower CoS values, e.g., CoS 0 to 3. Such data plane class traffic is generally very aggressively policed to protect the main CPU, which can have an impact with respect to faster convergence or application performance in scaled environments. Generally, the CoPP thresholds are static in nature and are mostly based on the overall CPU processing and the control plane capacity of the platform. Generally, the traffic load utilization of class critical traffic, overall inband traffic utilization, etc., is not considered in CoPP.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
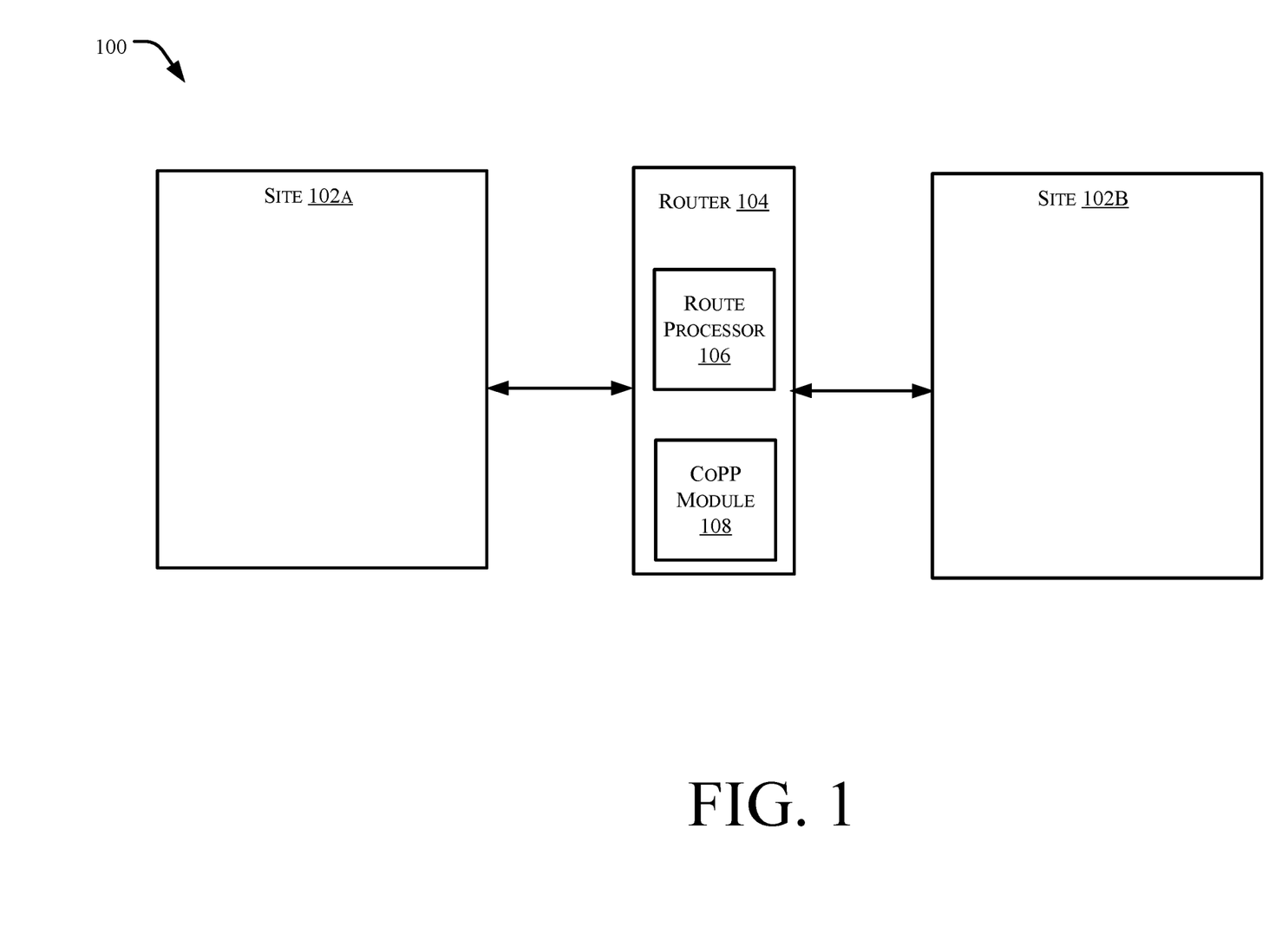
FIG. 1 schematically illustrates an example portion of a network that includes a router having a CoPP module.

FIG. 1 schematically illustrates an example portion of a network 100 of two sites 102a and 102b. The sites 102a and 102b may be implemented as part of a cloud network and/or an on-premises network. In FIG. 1, site 102a is coupled to site 102b via a router 104 (or in configurations, a switch). The router 104 may include a route processor (RP) 106, e.g., a primary CPU. The router 104 may also include a CoPP module 108.

In configurations, traffic between site 102a and site 102b may be managed by proactively changing the thresholds of lower CoS traffic based on the CoPP utilization of various protocol/BPDU class traffic, thereby improving data plane convergence and application performance in scaled environments.

Most network deployments are part of repeated workloads. For example, a stock exchange generally has a certain traffic pattern over a week, a month, and a year. A media broadcasting network generally also has a certain pattern over a day, a week, and so on. While the traffic pattern changes over a period of time, over a larger period of time, the traffic pattern follows in an ebb and flow pattern.

In real time, the router 104 is aware of how much control traffic the router 104 is currently processing and how much the router 104 is capable of processing. The router 104 is also aware of what packet drops are occurring due to CoPP being in place. All this information may be provided to the CoPP system or module 108 present on the router 104 to proactively adjust the rate or allocation of overall packets travelling to the control plane and in turn, to improve convergence while at the same time creating a learned pattern of traffic change over time.

In configurations, until the network traffic pattern is learned, any CoPP changes may be reactive in the network. Once a pattern is identified, the CoPP settings and parameters may be proactively modified in anticipation of upcoming changes in the traffic pattern. This tuning of the CoPP settings and parameters may allow traffic rates or allocations for various CoSs to be different than static default parameters of the CoPP and at the same time not affecting other elements. Additionally, as network traffic continues, the network traffic pattern may be updated as traffic patterns change, thus leading to altering of CoPP traffic rates for CoSs of packets.

In configurations, the network traffic pattern may be learned using a machine learning model or algorithm. In configurations, the machine learning model may be used to learn network traffic patterns through a training set of data mined from historical network traffic including data from the network 100, as well as other networks and/or network devices external to the network 100. The machine learning model learn network traffic patterns through current network, e.g., while network traffic is currently occurring, either separately or in conjunction with the historical training set. In such configurations, as previously noted, until the network traffic pattern is learned, any CoPP changes may be reactive in the network.

In configurations, the machine learning model, also known as a deep learning model, may comprise a Random Forest machine learning model, which is a supervised algorithm. In other configurations, the machine learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Other architectures and algorithms may be used for the deep learning model if desired. The machine learning model may be executed in a network device such as, for example, a router, a switch, a controller or master controller, etc.

Based on the hardware profile, various characteristics may be predefined for consideration in establishing the proactive network traffic pattern model for CoPP. For example, switch inband packet processing capability in packets/seconds (system capability in pps) may be predefined. This may be represented by total inband packet processing capability=inband_processing(capability, all classes).

Additionally, switch control plane application specific packet processing capability (per class system capability in pps) for each class (class as in CoPP profile) may be predefined. For example, assume there are three classes of traffic (CoS) defined in the following order: (i) priority 1 class=gt; class 1, capability=inband_processing(capability, class 1); (ii) priority 2 class=gt; class 2, capability=inband_processing(capability, class); and (iii) priority 3 class=gt; class 3, capability=inband_processing (capability, class 3).

Also, a mesaurement_interval may be predefined and may represent an interval at which drop rates are sampled at hardware ASIC level and provided to the RP 106. An adjustment_threshold may also be predefined and may represent a numeric value that determines a dynamic CoPP update trigger for a given class (this can be a per class value or a global value).

A rate of increase may also be predefined that defines a percentage increase in CoPP rates classes of traffic from their current values. Furthermore, a dynamic CoPP may be defined to be triggered only when RP 106 usage is normal (this value is predefined). All predefined values described herein may come from system default values or a template that users may tune further.

Measurements at any given time may include, for example, instant total inband packet processing=inband_processing(instant,all classes) and instant inband packet processing for a class=inband_processing(instant, lt;class gt;). Measurements at any given time may also include, for example, instant CPU (e.g., RP) utilization=CPU_utilization(instant, allclasses), instant drop rate=CoPP_drop_rate(Instant, lt;class gt;), and Current CoPP for a class=current_CoPP (Instant, lt;class gt;). Instant CoPP drop rate for each class known at ASIC hardware amy also be provided at any given time. This measurement may be normalized in packets per second and provided to the RP 106 at a predefined interval.

Information provided to the machine learning model, e.g., a machine learning engine may include over time inband packet processing for several different periods of time, e.g., a day, a week, a month, a year, etc. The measurements may be based on time of day, day of week, day of month, day of year, season, etc. Additional information that may be provided to the machine learning model may also include, for example, over time inband packet processing for a CoS at several different periods of time, e.g., a day, a week, a month, a year, etc. The measurements may be based on time of day, day of week, day of month, day of year, season, etc. Further information that may be provided to the machine learning model may also include over time instant RP 106 utilization, over time drop rate for packets, over time CoPP for a CoS, and over time CoPP packet drop rate for each CoS known at ASIC hardware.

Implementation of the proactive CoPP settings may also consider the number of active fast ethernets (FEs) (which are moving certain amounts of the control traffic to the router's CPU) available on the router 104. For example, considering allowed ARP for 1500 packets/second, it may take 60 seconds+ to do ARP for 90K hosts. If that amount is increased to 3000 packets/second, convergence improves by 50%.

It should be noted that there may be different CoSs that need attention at a given time. In configurations, the CoPP system described herein may act on the CoSs on a predefined priority. For example, ARP class traffic may be handled at higher priority than glean class traffic since ARP drops may result in re-ARP traffic and hosts may have to reply multiple times.

Also, once adjusted CoPP rates for each CoS is known (Adjusted_CoPP(Instant,<Class>)), the adjusted CoPP rates may be pushed to the CoPP module 108 on hardware ASIC of the router 104 and an adjustment_threshold may be reset. At this time a CoPP adjustment cycle may be complete and the router 104 may wait for further feedback from hardware ASIC (when learning the pattern) or wait for the next traffic pattern change from the learned pattern.

Accordingly, the techniques and architecture described herein provide for dynamic tuning of CoPP policy rates based on the learning of a traffic pattern across the network to optimize the router's CoPP resources and minimal (or zero) CoPP packet drops. The techniques continue s to use CoS and dynamically adjust CoPP rates across different nodes as per the network traffic pattern across the network. The dynamically adjusted CoPP rates on the network nodes may differ to optimize the overall network. With the advent of SDN/VxLAN/IaaS solutions, networks are very dynamic and may require CoPP rate limits to change as per the network traffic pattern of the day (across the fabric/network) and the requirement of CoPP rates may be different for each node of the network as per its positioning in the network.

Figure 2:
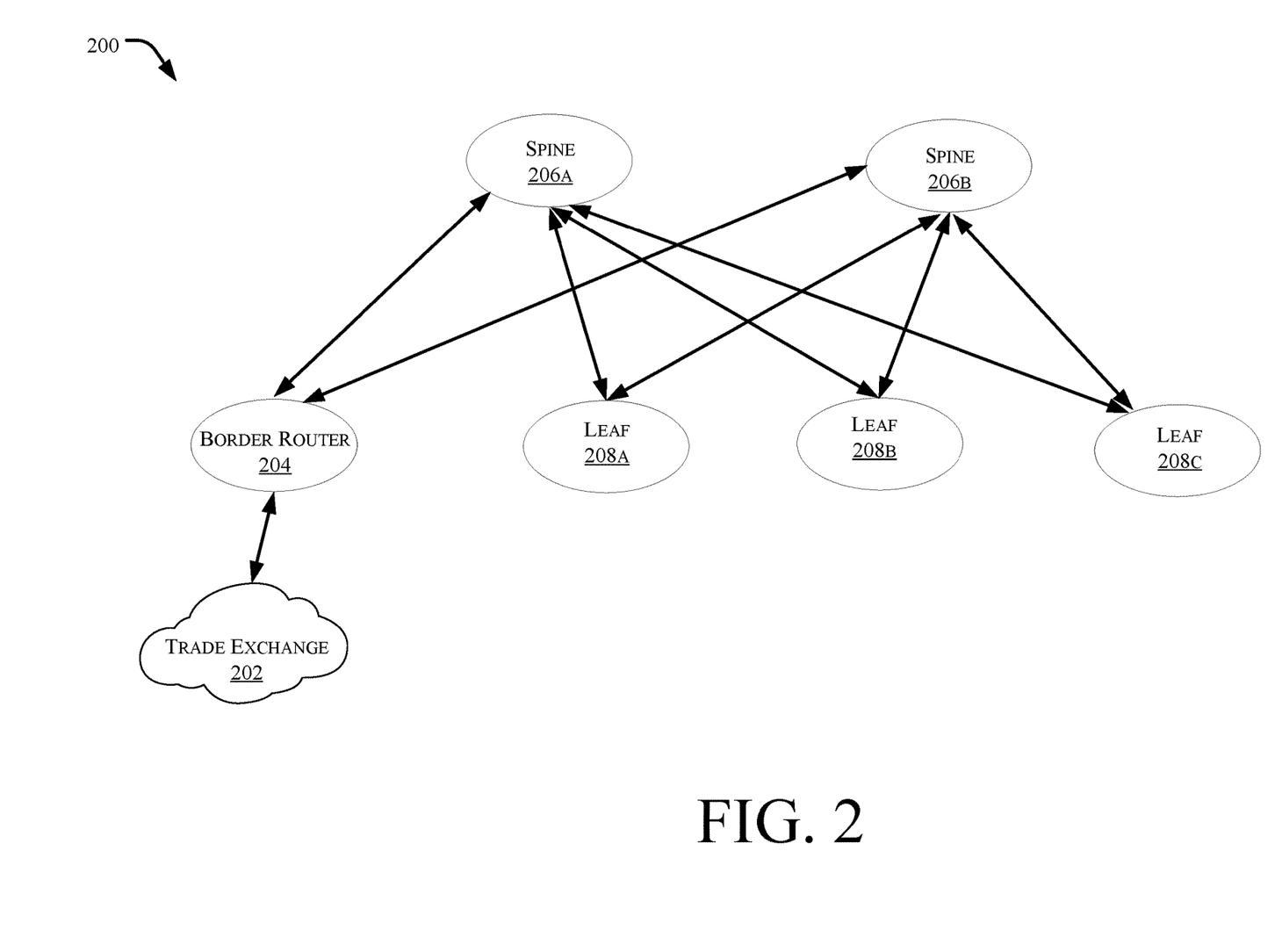
FIG. 2 schematically illustrates portion of a network that includes a trade exchange and various routers.

As an example, consider a high frequency trading platform. Referring to FIG. 2, a portion of a network 200 includes a trade exchange 202 coupled to a border router 204, which is coupled to two spines (routers) 206a, 206b. The two spines 206a, 206b are each coupled to three leaves (routers) 208a, 208b, 208c.

In the example network topology of FIG. 2, the requirement of different protocol CoPP rate-limits may be different across routers (e.g., leaves 208) as per the time of the day and the traffic profile each router carries. During the beginning of trading days, there may be a huge burst of traffic from the trade exchange and the requirement of CoPP rate-limits of different CoPP queues may be different across the network routers. For example, router(s) that are connected to the source (first hop router—also known as FHR or border router 204) towards the trade exchange 202 (exchange side) may see lots of source traffic directed to SUP/CPU using a CoPP-system-p-class-l3mc-data CoPP queue. Hence, it may be ideal to increase this CoPP queue-limit on the border router 204 while during the rest of the day, this CoPP queue may be put at min (default/desired) rate-limit. The traffic may be sent to the spine(s) 206 using PIM-register messages and the spine (RP) may see a burst in PIM register messages and hence require an increase in the PIM-Register CoPP queue than the CoPP-system-p-class-l3mc-data CoPP in the case of the border router 204. On the other hand, the receiver nodes, e.g., the last hop router (LHR) 208c where receivers/listeners for the trade exchange 202 feeds are connected will have burstiness/churn of igmp packets. Thus, during the start of trading (as it is a fixed time of the day), the requirement of CoPP queue limit is different across network routers based on its role. After the trading window, the same set of nodes/routers may cater to a different set of traffic profiles and the CoPP requirement may change during that time of the day. Currently, routers may have predefined CoPP profiles to cater to the above network requirements but such CoPP profiles are statically configured. Thus, the techniques described herein learn the patterns of network traffic across network routers and apply the CoPP queue rate-limit on different routers based on the router's role in the network during, for example, the time of day.

As previously noted, some network traffic classes (CoS) are always a priority (e.g., BPDU, routing protocol (OSPF/PIM/EIGRP, etc.) and thus, their CoPP rates are generally not adjusted. However, other classes of traffic may be be dynamically adjusted to get better network performance overall. For example, First Hop Router (FHR) vs Last hop router (LHR) in multicast networks, PIM register traffic on RP, PIM join/prune packets, ARP and glean traffic for convergence, Sflow packets to the CPU, other custom CoPP traffic (service oriented or customer specific use case), and VxLAN eVPN overlay ARP traffic may be adjusted. These protocols are very dynamic in nature. However, on a stable network there is always a traffic pattern followed for these types of traffic. Considering the trading network of FIG. 2, there are set usage patterns in such a network that can be monitored, learned, and adapted over time.

Continuing with the example of FIG. 2, whenever a sender starts transmitting, for example, multicast traffic, this traffic gets punted to SUP/CPU on the FHR 204 alone. Assume the class for this CoPP queue is copp-dst-miss. The FHR 204 sends the PIM register to the rendevous-point in the network periodically. Assume this class for this CoPP queue is copp-pim-register. When the receiver/listener endpoints send IGMP/MLD joins, they get punted to the SUP on the LHR, e.g., leaf 208c. Assume this CoPP class for this CoPP queue is copp-igmp. Now the LHR 208c may generate and send PIM Join/Prune towards the rendezvous-point/FHR periodically. Note: each copp queue may have multiple classifications such as, for example, copp-pim-reg may have a classification for pim v4/v6 join/prune, msdp, etc. Hence, each CoPP queue is needed on all network devices. For simplicity the CoPP queues (for CoSs) are being represented with just minimal classification. In fact, users may classify CoPP queues based on their needs. With the massive scale requirement of, for example, 128K multicast flows, it is important to intelligently allocate the CoPP queues based on the need of hours. Table 1 below illustrates example CoPP rates.

TABLE 1

|  | FHR | SPINE | LHR |
|---|---|---|---|
| Default Setting on rest of the day | Copp-igmp: police cir 3000 kbps Copp-dst-miss: police cir 1000 kbps Copp-pim-register: police cir 2000 kbps | Copp-igmp: police cir 3000 kbps Copp-dst-miss: police cir 1000 kbps Copp-pim-register: police cir 2000 kbps | Copp-igmp: police cir 3000 kbps Copp-dst-miss: police cir 1000 kbps Copp-pim-register: police cir 2000 kbps |
| Before Hour Trading (7AM to 9AM) | Copp-igmp: police cir 1500 kbps Copp-dst-miss: police cir 3000 kbps Copp-pim-register: police cir 1500 kbps | Copp-igmp: police cir 1500 kbps Copp-dst-miss: police cir 1500 kbps Copp-pim-register: police cir 3000 kbps | Copp-igmp: police cir 3000 kbps Copp-dst-miss: police cir 1500 kbps Copp-pim-register: police cir 1500 kbps |
| During | Copp-igmp: | Copp-igmp: | Copp-igmp: |

TABLE 1-continued

| | FHR | SPINE | LHR |
|---|---|---|---|
| First Hour of Trading (9AM to 12AM) During Second Hour of Trading | police cir 3500 kbps Copp-dst-miss: police cir 1000 kbps Copp-pim-register: police cir 1500 kbps Copp-igmp: police cir 1500 kbps Copp-dst-miss: police cir 3000 kbps Copp-pim-register: police cir 1500 kbps | police cir 3500 kbps Copp-dst-miss: police cir 1000 kbps Copp-pim-register: police cir 1500 kbps Copp-igmp: police cir 1500 kbps Copp-dst-miss: police cir 1500 kbps Copp-pim-register: police cir 3000 kbps | police cir 3500 kbps Copp-dst-miss: police cir 1000 kbps Copp-pim-register: police cir 1500 kbps Copp-igmp: police cir 3000 kbps Copp-dst-miss: police cir 1500 kbps Copp-pim-register: police cir 1500 kbps |
| Rest of the DAY | Default settings | Default settings | Default settings |

Thus, the techniques described herein provide an adaptive CoPP that can adapt and change based on actual network control traffic rather than static CoPP rates. An aggressive CoPP can protect the CPU (route processor) of a network device, e.g., routers and switches, but may also penalize convergence and performance. An adaptive CoPP may protect CPU as well as boost convergence and performance parameters. In particular, traffic between two sites may be managed by proactively changing the thresholds of lower CoS traffic based on the CoPP utilization of various protocol/BPDU class traffic, thereby improving data plane convergence and application performance in scaled environments.

Figure 3:
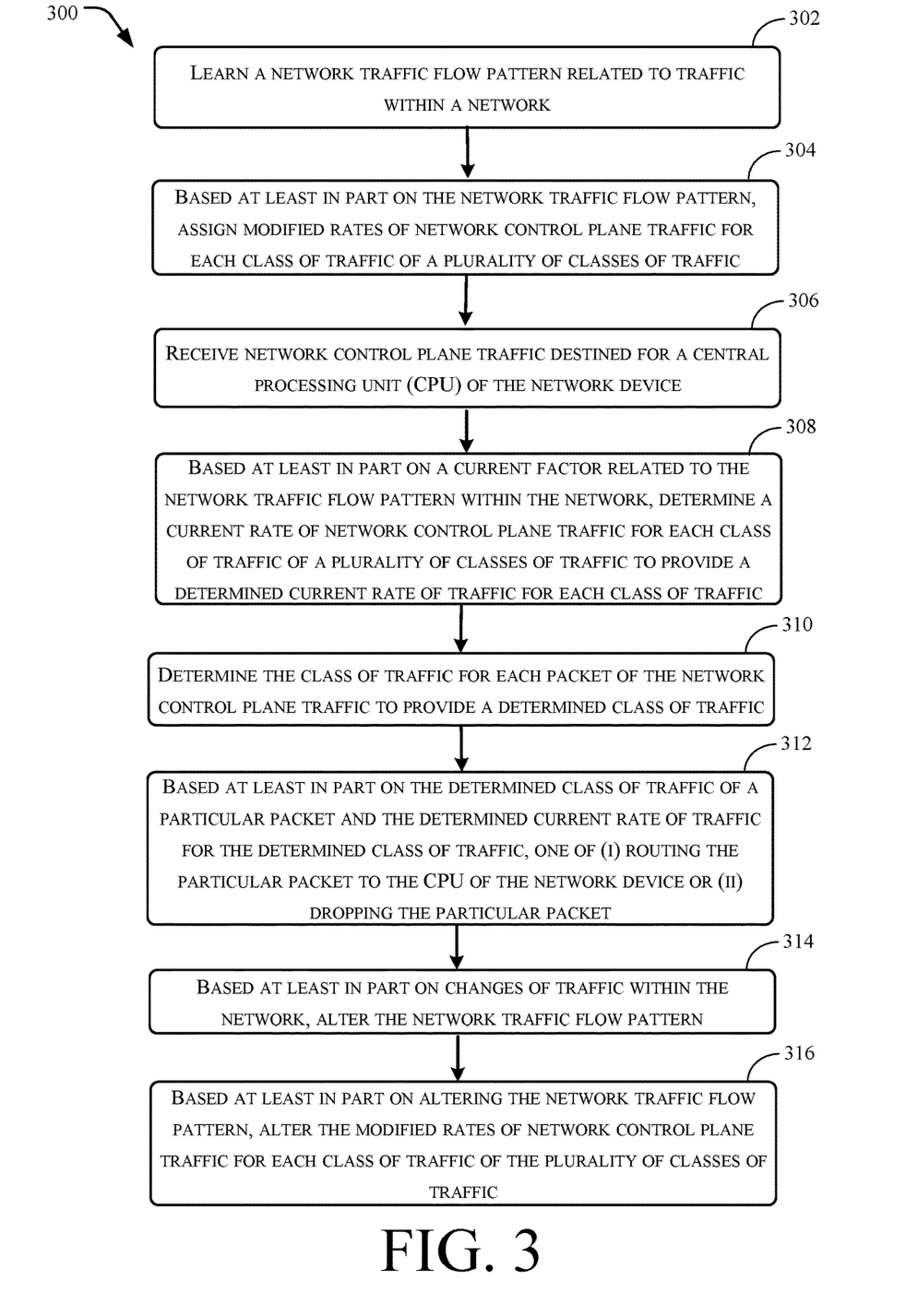
FIG. 3 illustrates a flow diagram of an example method for dynamically managing CoPP rates or allocations of control plane traffic of a network.

FIG. 3 illustrates a flow diagram of an example method 300 and illustrates aspects of the functions performed at least partly by a network device of a network as described with respect to FIGS. 1 and 2. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for dynamically managing CoPP rates or allocations of control plane traffic of a network. In some examples, the method 300 may be performed by a system comprising one or more processors and one or more non-transitory computer-readable media storing computer-executable instructions that, when executed by the one or more processors, cause the one or more processors to perform the method 300.

At 302, a network device learns a network traffic flow pattern related to traffic within a network. At 304, based at least in part on the network traffic flow pattern, the network device assigns modified rates of network control plane traffic for each class of traffic of a plurality of classes of traffic. In configurations, the modified rates of network control plane traffic are with respect to default rates of network control plane traffic for each class of traffic of a plurality of classes of traffic. At 306, the network device receives network control plane traffic destined for a central processing unit (CPU) of the network device.

At 308, based at least in part on a current factor related to the network traffic flow pattern within the network, the network device determines a current rate of network control plane traffic for each class of traffic of a plurality of classes of traffic to provide a determined current rate of traffic for each class of traffic. At 310, the network device determines the class of traffic for each packet of the network control plane traffic to provide a determined class of traffic. At 312, based at least in part on the determined class of traffic of a particular packet and the determined current rate of traffic for the determined class of traffic, the network device performs one of (i) routing the particular packet to the CPU of the network device or (ii) dropping the particular packet. At 314, based at least in part on changes of traffic within the network, the network device alters the network traffic flow pattern. At 316, based at least in part on altering the network traffic flow pattern, the network device alters the modified rates of network control plane traffic for each class of traffic of the plurality of classes of traffic.

Figure 4:
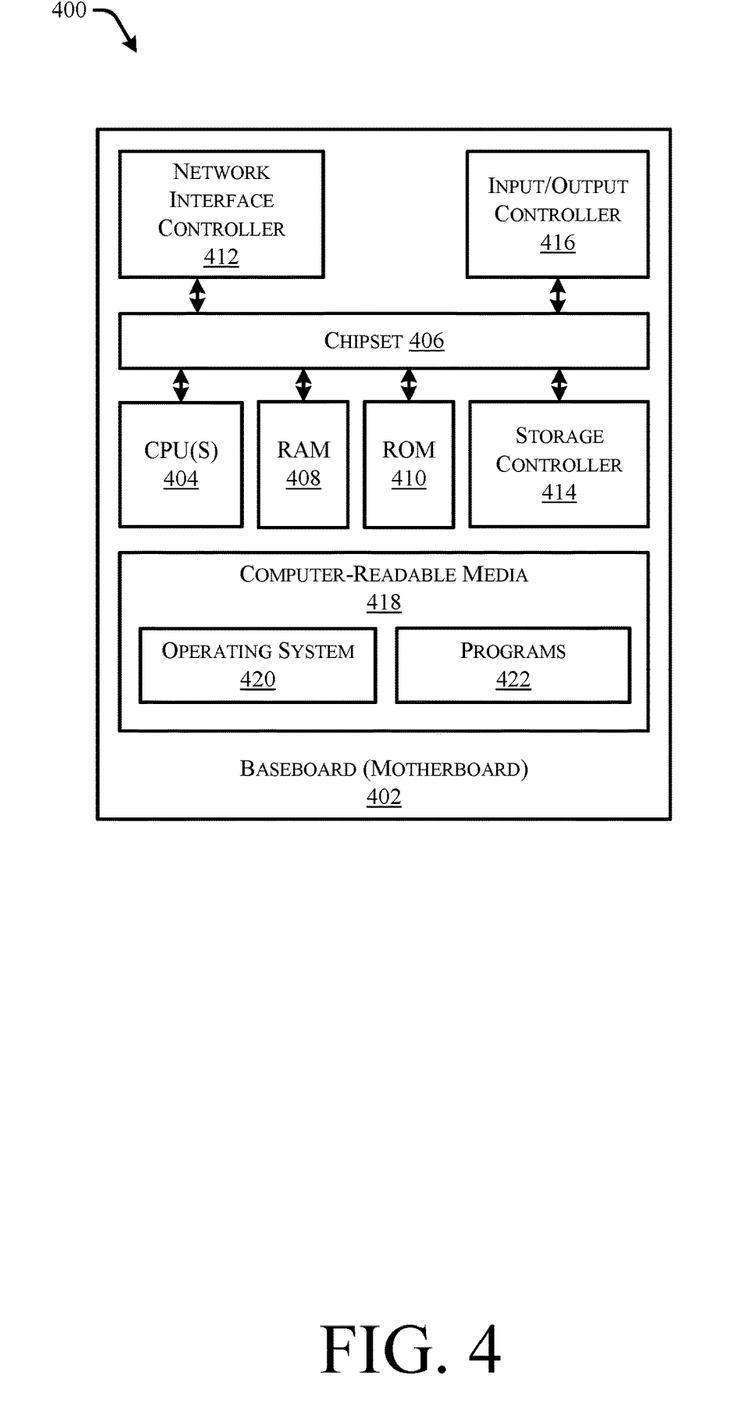
FIG. 4 is a computer architecture diagram showing an illustrative computer hardware architecture for implementing a network device that can be utilized to implement aspects of the various technologies presented herein.

FIG. 4 shows an example computer architecture for a computing device 402 capable of executing program components for implementing the functionality described above. In configurations, the computing device 402 may be used to implement router 104 or a network controller node for example. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 402 may, in some examples, correspond to a physical devices or resources described herein.

The computing device 402 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 402.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 402. The chipset 406 can further provide an interface to a computer-readable storage medium such as a read-only memory ("ROM") 410 or non-volatile RAM ("NVRAM") for storing basic routines that help to startup the computing device 402 and to transfer information between the various components and devices. The ROM 410 or NVRAM can also store other software components necessary for the operation of the computing device 402 in accordance with the configurations described herein.

The computing device 402 can operate in a networked environment using logical connections to remote computing devices and computer systems through a network, such as the network 408. The chipset 406 can include functionality for providing network connectivity through a NIC 412, such as a gigabit Ethernet adapter. The NIC 412 is capable of connecting the computing device 402 to other computing devices over the network 408. It should be appreciated that multiple NICs 412 can be present in the computing device 402, connecting the computer to other types of networks and remote computer systems.

The computing device 402 can be connected to a storage device 418 that provides non-volatile storage for the computer. The storage device 418 can store an operating system 420, programs 422, and data, which have been described in greater detail herein. The storage device 418 can be connected to the computing device 402 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 402 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 402 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 402 can further read information from the storage device 418 by detecting the physical states or characteristics of one or more particular locations within the physical storage units.

In addition to the mass storage device 418 described above, the computing device 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 402. In some examples, the operations performed by the cloud computing network, and or any components included therein, may be supported by one or more devices similar to computing device 402. Stated otherwise, some or all of the operations described herein may be performed by one or more computing devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 402. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 402.

In one embodiment, the storage device 418 or other computer-readable storage media is encoded with computer-executable instructions which, when loaded into the computing device 402, transform the computer from a general-purpose computing system into a special-purpose computer capable of implementing the embodiments described herein. These computer-executable instructions transform the computing device 402 by specifying how the CPUs 404 transition between states, as described above. According to one embodiment, the computing device 402 has access to computer-readable storage media storing computer-executable instructions which, when executed by the computing device 402, perform the various processes described above with regard to FIGS. 1-3. The computing device 402 can also include computer-readable storage media having instructions stored thereupon for performing any of the other computer-implemented operations described herein.

The computing device 402 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 402 might not include all of the components shown in FIG. 4, can include other components that are not explicitly shown in FIG. 4, or might utilize an architecture completely different than that shown in FIG. 4.

The computing device 402 may support a virtualization layer, such as one or more virtual resources executing on the computing device 402. In some examples, the virtualization layer may be supported by a hypervisor that provides one or more virtual machines running on the computing device 402 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
    learning, at a network device, a historic network traffic flow pattern related to traffic within a network, wherein learning the historic network traffic flow pattern related to traffic within the network comprises learning the historic network traffic flow pattern related to traffic within the network using a machine learning model;
    based at least in part on the historic network traffic flow pattern, pre-defining, by the network device, two or more pre-defined modified rates of network control plane traffic for at least one class of traffic of a plurality of classes of traffic, wherein the two or more pre-defined modified rates of network control plane traffic are with respect to default rates of network control plane traffic for the at least one class of traffic of the plurality of classes of traffic;
    receiving, at the network device within the network, network control plane traffic destined for a central processing unit (CPU) of the network device;
    based at least in part on a current factor related to the historic network traffic flow pattern within the network, proactively selecting, by the network device, one of the two or more pre-defined modified rates of network control plane traffic for each class of traffic of the plurality of classes of traffic to provide a selected current rate of traffic for each class of traffic, wherein the current factor comprises one or more of a time of day, a day of week, a month, a date within a month, or a season;
    implementing the selected current rates of network control plane traffic in the network;
    determining, by the network device, the class of traffic for each packet of the network control plane traffic to provide a determined class of traffic;
    based at least in part on the determined class of traffic of a particular packet and the selected current rate of traffic for the determined class of traffic, one of (i) routing the particular packet to the CPU of the network device or (ii) dropping the particular packet;
    based at least in part on changes of traffic within the network, altering, by the network device, the historic network traffic flow pattern, wherein altering the historic network traffic flow pattern comprises altering the historic network traffic flow pattern using the machine learning model; and
    based at least in part on altering the historic network traffic flow pattern, altering, by the network device, the two or more pre-defined modified rates of network control plane traffic for the at least one class of traffic of the plurality of classes of traffic.

2. The computer-implemented method of claim 1, wherein the network device comprises one of a router or a switch.

3. The computer-implemented method of claim 1, further comprising:
    prior to learning the historic network traffic flow pattern, reactively implementing, by the network device, the two or more modified rates of network control plane traffic for the at least one class of traffic of the plurality of classes of traffic based on a current traffic flow volume.

4. The computer-implemented method of claim 1, wherein the classes of traffic comprise at least three classes of traffic, and wherein assigning two or more modified rates of network control plane traffic for at least one class of traffic of a plurality of classes of traffic comprises assigning two or more modified rates of network control plane traffic for at least two classes of traffic of a plurality of classes of traffic.

5. The computer-implemented method of claim 4, wherein:
    the classes of traffic further comprise at least one critical class of traffic; and
    the at least one critical class of traffic is always equal to or greater than a default rate of network control plane traffic.

6. The computer-implemented method of claim 4, wherein:
    the at least three classes of traffic are prioritized; and
    a lowest class of traffic has a modified rate of network control plane traffic.

7. A system comprising:
    one or more processors; and
    one or more non-transitory computer-readable media storing computer-executable instructions that, when executed by the one or more processors, cause the one or more processors to perform actions comprising:
        learning, at a network device, a historic network traffic flow pattern related to traffic within a network, wherein learning the historic network traffic flow pattern related to traffic within the network comprises learning the historic network traffic flow pattern related to traffic within the network using a machine learning model;
        based at least in part on the historic network traffic flow pattern, pre-defining, by the network device, two or more pre-defined modified rates of network control plane traffic for at least one class of traffic of a plurality of classes of traffic, wherein the two or more pre-defined modified rates of network control plane traffic are with respect to default rates of network control plane traffic for the at least one class of traffic of the plurality of classes of traffic;

receiving, at the network device within the network, network control plane traffic destined for a central processing unit (CPU) of the network device;

based at least in part on a current factor related to the historic network traffic flow pattern within the network, proactively selecting, by the network device, one of the two or more pre-defined modified rates of network control plane traffic for each class of traffic of the plurality of classes of traffic to provide a selected current rate of traffic for each class of traffic, wherein the current factor comprises one or more of a time of day, a day of week, a month, a date within a month, or a season;

implementing the selected current rates of network control plane traffic in the network;

determining, by the network device, the class of traffic for each packet of the network control plane traffic to provide a determined class of traffic;

based at least in part on the determined class of traffic of a particular packet and the selected current rate of traffic for the determined class of traffic, one of (i) routing the particular packet to the CPU of the network device or (ii) dropping the particular packet;

based at least in part on changes of traffic within the network, altering, by the network device, the historic network traffic flow pattern, wherein altering the historic network traffic flow pattern comprises altering the historic network traffic flow pattern using the machine learning model; and based at least in part on altering the historic network traffic flow pattern, altering, by the network device, the two or more pre-defined modified rates of network control plane traffic for the at least one class of traffic of the plurality of classes of traffic.

8. The system of claim 7, wherein the network device comprises one of a router or a switch.

9. The system of claim 7, wherein the actions further comprise:
prior to learning the historic network traffic flow pattern, reactively implementing, by the network device, the two or more modified rates of network control plane traffic for the at least one class of traffic of the plurality of classes of traffic based on a current traffic flow volume.

10. The system of claim 7, wherein the classes of traffic comprise at least three classes of traffic, and wherein assigning two or more modified rates of network control plane traffic for at least one class of traffic of a plurality of classes of traffic comprises assigning two or more modified rates of network control plane traffic for at least two classes of traffic of a plurality of classes of traffic.

11. The system of claim 10, wherein:
the classes of traffic further comprise at least one critical class of traffic; and
the at least one critical class of traffic is always equal to or greater than a default rate of network control plane traffic.

12. The system of claim 10, wherein:
the at least three classes of traffic are prioritized; and
a lowest class of traffic has a modified rate of network control plane traffic.

13. One or more non-transitory computer-readable media storing computer-executable instructions that, when executed by one or more processors, cause the one or more processors to perform actions comprising:
learning, at a network device, a historic network traffic flow pattern related to traffic within a network, wherein learning the historic network traffic flow pattern related to traffic within the network comprises learning the historic network traffic flow pattern related to traffic within the network using a machine learning model;

based at least in part on the historic network traffic flow pattern, pre-defining, by the network device, two or more pre-defined modified rates of network control plane traffic for at least one class of traffic of a plurality of classes of traffic, wherein the two or more pre-defined modified rates of network control plane traffic are with respect to default rates of network control plane traffic for the at least one class of traffic of the plurality of classes of traffic;

receiving, at the network device within the network, network control plane traffic destined for a central processing unit (CPU) of the network device;

based at least in part on a current factor related to the historic network traffic flow pattern within the network, proactively selecting, by the network device, one of the two or more pre-defined modified rates of network control plane traffic for each class of traffic of the plurality of classes of traffic to provide a selected current rate of traffic for each class of traffic, wherein the current factor comprises one or more of a time of day, a day of week, a month, a date within a month, or a season;

implementing the selected current rates of network control plane traffic in the network;

determining, by the network device, the class of traffic for each packet of the network control plane traffic to provide a determined class of traffic;

based at least in part on the determined class of traffic of a particular packet and the selected current rate of traffic for the determined class of traffic, one of (i) routing the particular packet to the CPU of the network device or (ii) dropping the particular packet;

based at least in part on changes of traffic within the network, altering, by the network device, the historic network traffic flow pattern, wherein altering the historic network traffic flow pattern comprises altering the historic network traffic flow pattern using the machine learning model; and based at least in part on altering the historic network traffic flow pattern, altering, by the network device, the two or more pre-defined modified rates of network control plane traffic for the at least one class of traffic of the plurality of classes of traffic.

14. The one or more non-transitory computer-readable media of claim 13, wherein the actions further comprise:
prior to learning the historic network traffic flow pattern, reactively implementing, by the network device, the two or more modified rates of network control plane traffic for the at least one class of traffic of the plurality of classes of traffic based on a current traffic flow volume.

15. The one or more non-transitory computer-readable media of claim 13, wherein the classes of traffic comprise at least three classes of traffic, and wherein assigning two or more modified rates of network control plane traffic for at least one class of traffic of a plurality of classes of traffic comprises assigning two or more modified rates of network control plane traffic for at least two classes of traffic of a plurality of classes of traffic.

16. The one or more non-transitory computer-readable media of claim 13, wherein:
- the classes of traffic further comprise at least one critical class of traffic; and
- the at least one critical class of traffic is always equal to 5 or greater than a default rate of network control plane traffic.

* * * * *